(12) United States Patent
Yadav et al.

(10) Patent No.: US 11,821,319 B2
(45) Date of Patent: Nov. 21, 2023

(54) FRANGIBLE AIRFOIL WITH SHAPE MEMORY ALLOY

(71) Applicant: General Electric Company, Schenectady, NY (US)

(72) Inventors: Abhijeet Jayshingrao Yadav, Karad (IN); Nitesh Jain, Bangalore (IN); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/490,401

(22) Filed: Sep. 30, 2021

(65) Prior Publication Data

US 2023/0029918 A1 Feb. 2, 2023

(51) Int. Cl.
*F01D 5/14* (2006.01)
*F03G 7/06* (2006.01)

(52) U.S. Cl.
CPC ........... *F01D 5/148* (2013.01); *F03G 7/0614* (2021.08); *F05D 2220/32* (2013.01); *F05D 2230/31* (2013.01); *F05D 2240/307* (2013.01)

(58) Field of Classification Search
CPC .. F01D 5/148; F03G 7/0614; F05D 2240/307; F05D 2220/32; F05D 2230/31
See application file for complete search history.

(56) References Cited

U.S. PATENT DOCUMENTS

| | | | |
|---|---|---|---|
| 7,384,240 B2 | 6/2008 | McMillan et al. | |
| 8,974,884 B2* | 3/2015 | Fabre | B32B 38/0036 428/68 |
| 10,352,173 B2 | 7/2019 | Prince et al. | |
| 2006/0140772 A1 | 1/2006 | McMillan et al. | |
| 2008/0145204 A1* | 6/2008 | Clark | F01D 7/00 415/48 |
| 2011/0217170 A1* | 9/2011 | Buffone | B64C 11/20 416/128 |
| 2012/0045318 A1 | 2/2012 | LaMaster et al. | |
| 2013/0302168 A1* | 11/2013 | Kray | F01D 5/141 416/131 |
| 2017/0254208 A1* | 9/2017 | Prince | B29D 99/0025 |
| 2018/0298765 A1* | 10/2018 | Beyer | F01D 5/147 |
| 2019/0323364 A1* | 10/2019 | Sippel | F01D 5/20 |
| 2020/0032655 A1 | 1/2020 | Prince et al. | |
| 2020/0123905 A1 | 4/2020 | Husband et al. | |
| 2022/0341329 A1* | 10/2022 | Yadav | F01D 5/02 |

FOREIGN PATENT DOCUMENTS

| | | |
|---|---|---|
| DE | 10028693 A1 | 12/2001 |
| EP | 2999627 B1 | 9/2016 |
| EP | 3214268 A1 | 9/2017 |
| GB | 2536707 A | 9/2016 |
| SU | 911152 B * | 3/1982 |

* cited by examiner

*Primary Examiner* — Jesse S Bogue
(74) *Attorney, Agent, or Firm* — Dority & Manning, P.A.

(57) ABSTRACT

An airfoil including a plurality of composite plies extending from a leading edge to a trailing edge and between a tip and a root. The airfoil further includes a frangible airfoil portion at the tip extending between the leading edge and the trailing edge and extending between the tip and a frangible line along a span. The frangible airfoil portion including a plurality of composite plies and one or more shape memory alloy inserts disposed between the plurality of composite plies. A gas turbine engine including a frangible airfoil and methods for forming a frangible airfoil are also disclosed.

18 Claims, 8 Drawing Sheets

FRANGIBLE AIRFOIL WITH SHAPE MEMORY ALLOY

PRIORITY INFORMATION

The present application claims priority to Indian Patent Application Number 202111033700 filed on Jul. 27, 2021.

FIELD

The present subject matter relates generally to airfoils, and more particularly, to frangible airfoils including shape memory alloy (SMA) materials.

BACKGROUND

Gas turbine engines, such as turbofans, generally include fan cases surrounding a fan assembly including the fan blades. The fan cases are generally configured to withstand an impact of the fan blades due to adverse engine conditions resulting in a failure mode, such as foreign object damage, hard rubs due to excessive or extreme unbalance or fan rotor oscillations, or fan blade liberation. Fan cases generally include frangible structures, such as honeycombs or trench-filler material, configured to mitigate load transfer to and through the fan case. Inclusion of such trench-filler material results in a larger and/or heavier fan case. The inventors of the present disclosure have found that there is a need for an airfoil that enables a controlled and consistent failure mode of the airfoil that may enable reducing a cost, weight, and load transfer to a surrounding casing.

BRIEF DESCRIPTION OF THE DRAWINGS

A full and enabling disclosure of the present disclosure, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A frangible airfoil for gas turbine engines is generally provided. The airfoil may define a frangible airfoil portion that extends from the trailing edge to the leading edge and extends less than about 50% of the span from the tip. The frangible airfoil portion includes one or more composite plies and one or more SMA inserts. The frangible airfoil allows for deformation of the frangible airfoil portion without separation of the frangible airfoil portion from the remainder of the airfoil following an event creating imbalance. The embodiments generally shown and described herein may enable a controlled and consistent failure of the airfoil, such as a fan blade, following a failure event, such as a hard rub against a surrounding fan case. The embodiments generally described herein enable the airfoil to deform at a desired span of the airfoil to mitigate load transfer to a surrounding casing. The embodiments generally provided herein may further enable the airfoil to deform such that excessive or extreme unbalance of the fan rotor may be reduced following a failure event, such as airfoil liberation, foreign object damage (e.g., bird strikes, icing, etc.), or loss of lube or insert to a bearing assembly. Use of the frangible airfoils described, may reduce the amount of trench-filler material necessary when incorporated into a ducted gas turbine engine, resulting in a lighter and more efficient fan case.

Figure 1:
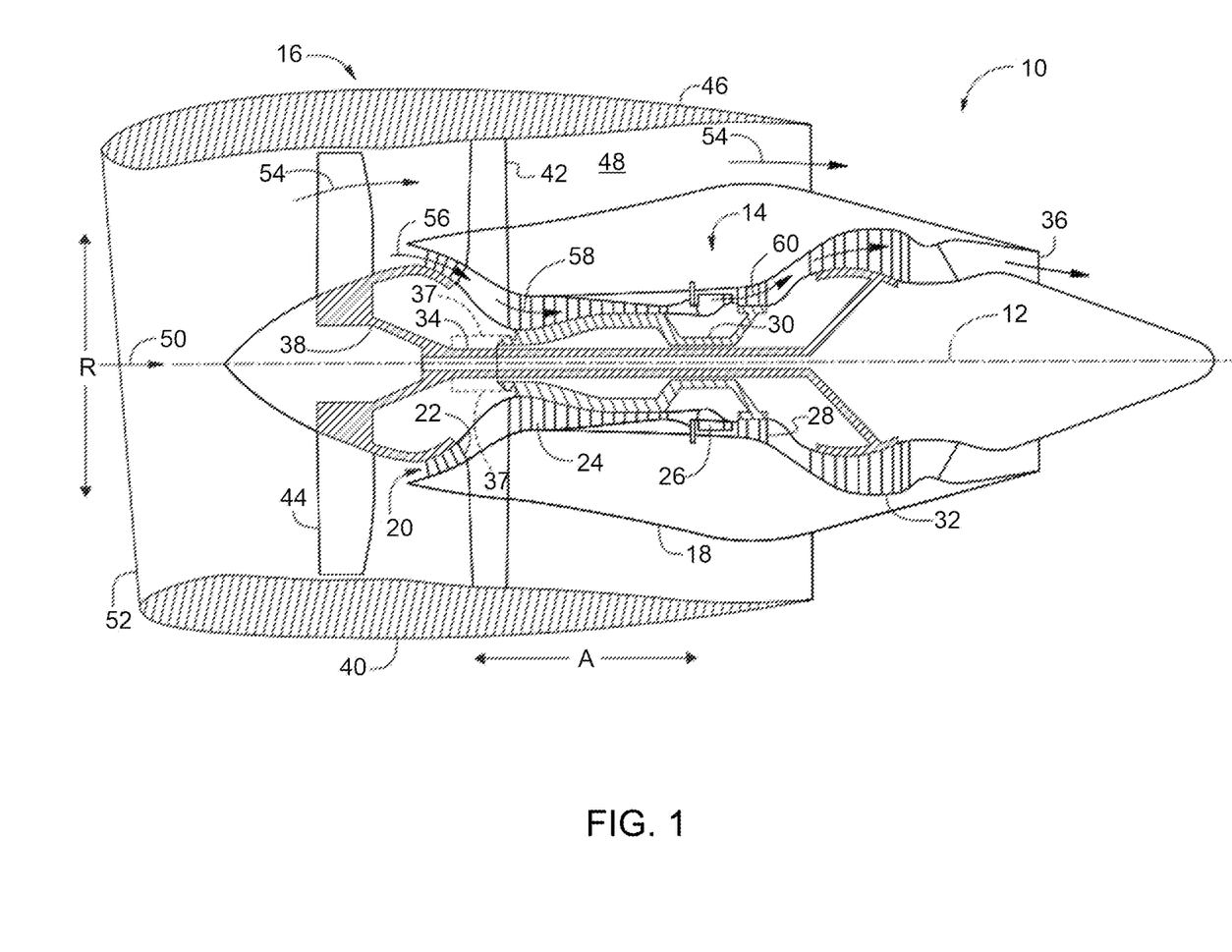
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extended from the axial centerline axis 12. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a turbomachine (indicated generally by reference character 14) and a fan section 16 positioned upstream thereof. The turbomachine 14 generally includes a substantially tubular outer casing 18 that defines an annular inlet 20. In addition, the outer casing 18 may further enclose and support a low pressure (LP) compressor 22 for increasing the pressure of the air that enters the turbomachine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products are directed from the combustor 26 along the hot gas path of the gas turbine engine 10 to a high pressure (HP) turbine 28 for driving the HP compressor 24 via a high pressure (HP) shaft 30, and then to a low pressure (LP) turbine 32 for driving the LP compressor 22 and fan section 16 via a low pressure (LP) shaft 34 that is generally coaxial with HP shaft 30. After driving each of turbines 28 and 32, the combustion products may be expelled from the turbomachine 14 via an exhaust nozzle 36 to provide propulsive jet thrust.

Additionally, the fan section 16 of the gas turbine engine 10 generally includes a rotatable, axial-flow fan rotor 38 configured to be surrounded by an annular fan casing 40. In particular embodiments, the LP shaft 34 may be connected directly to the fan rotor 38, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required.

It should be appreciated by those of ordinary skill in the art that the fan casing 40 may be configured to be supported relative to the turbomachine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the turbomachine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 2:
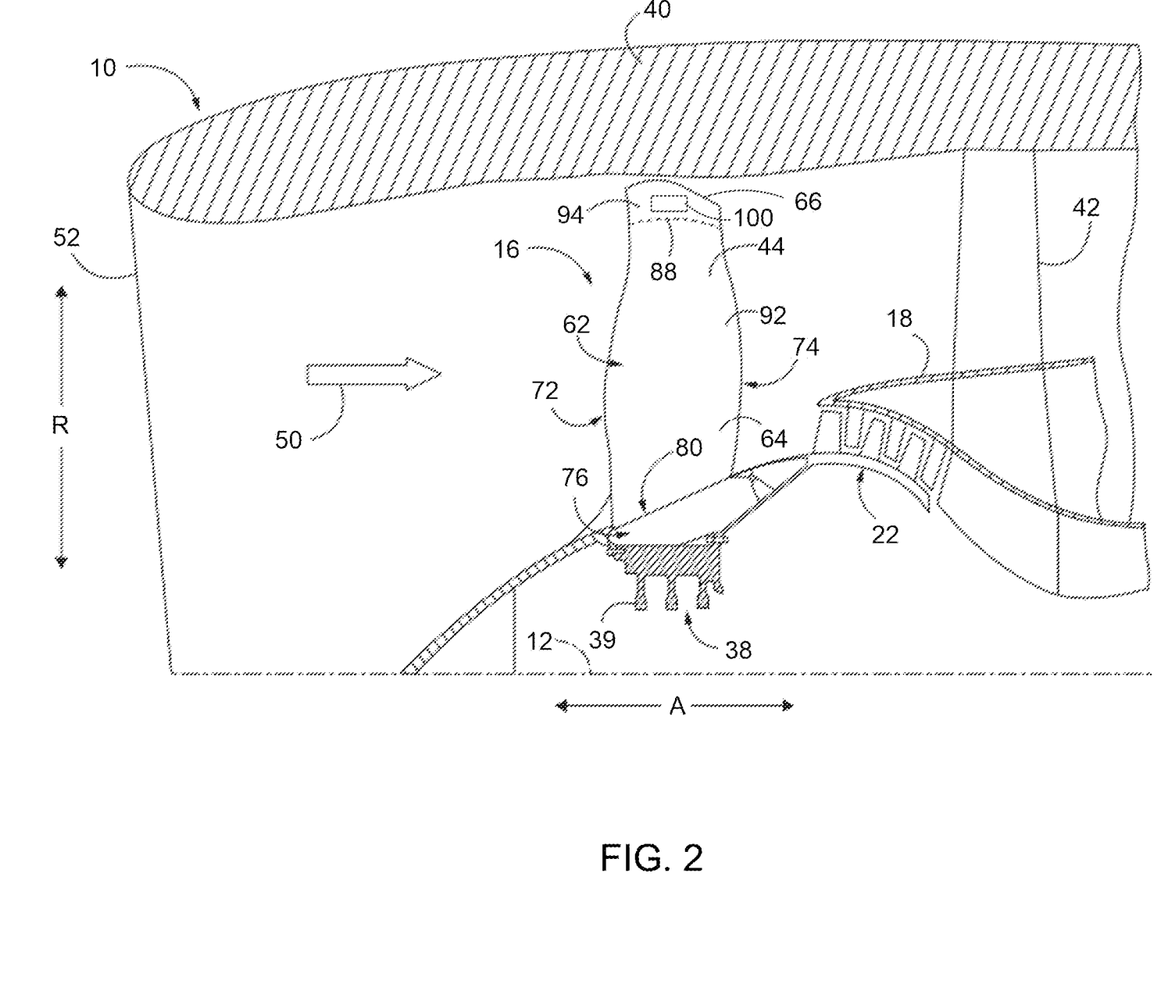
FIG. 2 illustrates a cross-sectional view of the fan section of FIG. 1 in accordance with aspects of the present subject matter, particularly illustrating a fan blade of the fan section.

Referring to FIG. 2, exemplary airfoil 62 embodiments are provided in the context of a fan blade 44 positioned in fan section 16. Although the illustrated airfoils 62 are shown as part of a fan blade 44, it is understood that the following discussion of an airfoil 62 may be equally applied to another airfoil embodiment, e.g., a stator vane or rotor blade of a compressor 22, 24 and/or turbine 28, 32 (see FIG. 1). The tubular outer casing 18, LP compressor 22, and outlet guide vanes 42 are also shown. As noted, during operation of the gas turbine engine 10, an initial airflow (indicated by arrow 50) enters the gas turbine engine 10 through an associated inlet 52 of the fan casing 40. The air flow 50 then passes through the fan blades 44. Optionally, each fan blade 44 includes an integral component having an axial dovetail 76 leading to a transition section 80. When mounted within the gas turbine engine 10 the axial dovetail 76 is disposed in a dovetail slot of the fan rotor disk 39, thereby attaching the fan blades 44 to the fan rotor 38. Each fan blade 44 extends radially outwardly from an airfoil root 64 to an airfoil tip 66. The airfoil includes a residual airfoil portion 92 and a frangible airfoil portion 94 that meet at the frangible line 88. The residual airfoil portion 92 and frangible airfoil portion 94 each extending between the airfoil's leading edge 72 to trailing edge 74 between the airfoil root 64 and airfoil tip 66. The frangible airfoil portion 94 includes one or more SMA inserts 100.

During operation of the gas turbine engine 10, such as following an event generating substantial imbalance in the fan rotor 38 or LP shaft 34, the frangible airfoil portion 94, e.g., of the fan blade 44 may be configured to deform or partially detach from the remainder of the airfoil 62, e.g., along or radially outward from the frangible line 88. Events generating substantial unbalance in the fan rotor 38 and/or LP shaft 34 may include, but are not limited to, foreign object damage (e.g., bird strikes, ice ingestion, other debris, etc.) or fan blade 44 detachment. Deformation of the frangible airfoil portion 94 may reduce undesired unbalance or vibrations as the fan rotor 38 and/or LP shaft 34 continue to rotate. Further, delamination of the frangible airfoil portion 94 can occur during light rub conditions, e.g. cross wind, or under medium rub conditions, e.g. bird impact. Inclusion of the SMA insert 100 described herein, can help prevent material loss of the airfoil tip 66 during certain conditions that can achieve controlled fan rubs. Moreover, inclusion of the SMA insert 100 can reduce material loss along the airfoil tip 66 during light rub events. Furthermore, the embodiments of the airfoil 62 may enable a lighter fan casing 44 or nacelle, such as reducing an amount of metal materials or abradable material of the fan casing 40 or nacelle.

Figure 3:
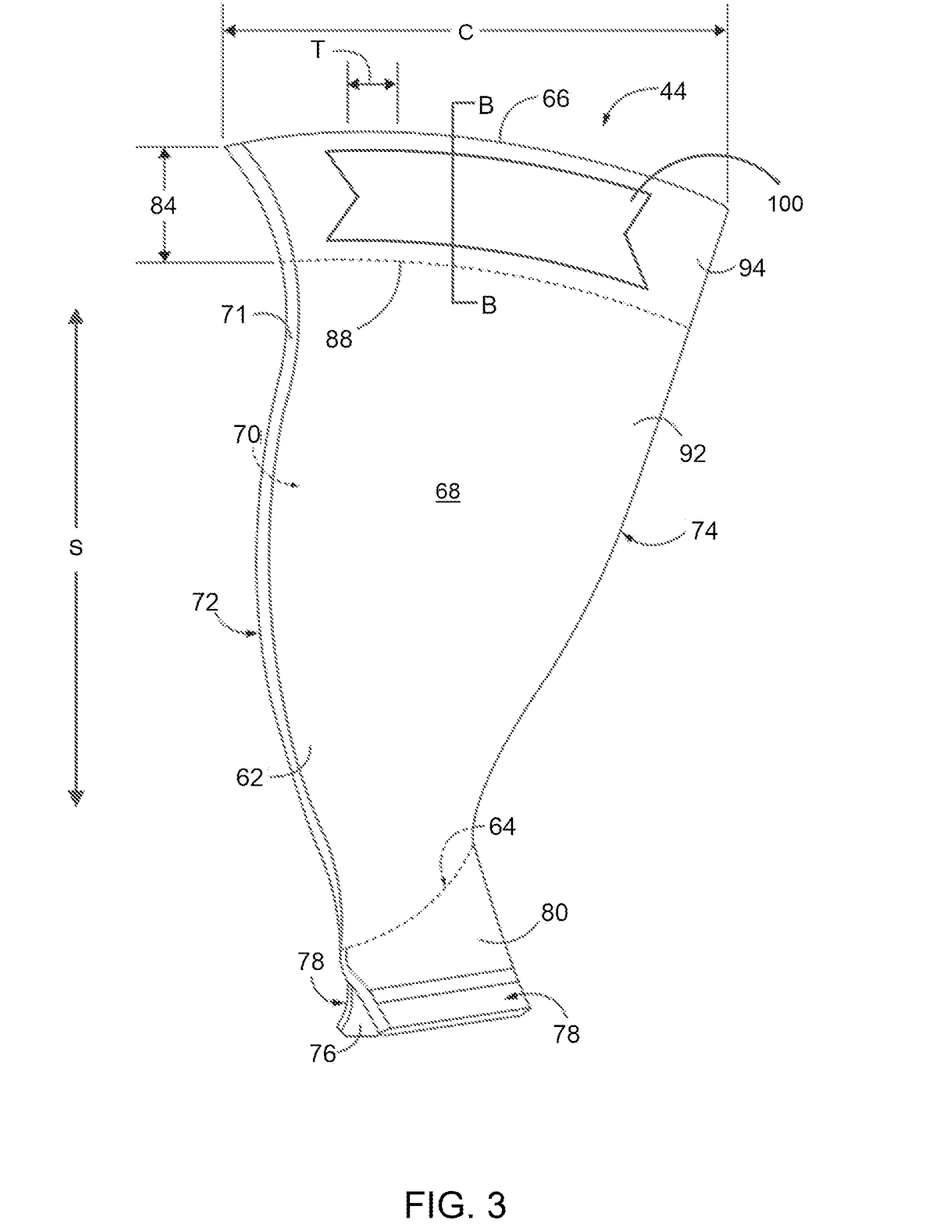
FIG. 3 illustrates a fan blade of the fan section of FIGS. 1 and 2 in accordance with aspects of the present subject matter, particularly illustrating a frangible airfoil portion and a residual airfoil portion.

Referring now to FIG. 3, an exemplary airfoil 62 for a fan blade 44 is shown. Optionally, each fan blade 44 includes an integral component having an axial dovetail 76 with a pair of opposed pressure faces 78 leading to a transition section 80. The fan blade 44 extends radially outwardly along a span defining a spanwise direction S from an airfoil root 64 to an airfoil tip 66. A pressure side 68 and a suction side 70 of the airfoil 62 extend from the airfoil's leading edge 72 to a trailing edge 74 and between the airfoil root 64 and airfoil tip 66 along the span. Further, it should be recognized that airfoil 62 may define a chordwise direction C along a chord at each point along the span and extending between the leading edge 72 and the trailing edge 74. Further, the chord may vary along the span of the airfoil 62. For instance, in the depicted embodiment, the chord increases along the span toward the airfoil tip 66. Though, in other embodiments, the chord may be approximately constant throughout the span or may decrease from the airfoil root 64 to the airfoil tip 66.

As shown particularly in FIG. 3, the airfoil 62 may define a thickness direction T along a thickness extending between the pressure side 68 and the suction side 70 at each point along the span. In certain embodiments, the thickness may be approximately constant throughout the span of the airfoil 62. In other embodiments, the airfoil 62 may define a variable thickness between the airfoil root 64 and the airfoil tip 66. For instance, the thickness may generally decrease along the span toward the airfoil tip 66. Additionally, the airfoil 62 may define an approximately constant thickness along the chord at each point along the span. Or, in other embodiments, at least one point along the span of the airfoil 62 may define a variable thickness along the chord. For instance, the airfoil 62 may define a maximum thickness at a position along the chord at each point along the span.

Further, the airfoil 62 may define a frangible line 88 separating a frangible airfoil portion 94 and a residual airfoil portion 92. The frangible airfoil portion 94 may generally be positioned toward the airfoil tip 66 and extend between the leading edge 72 and trailing edge 74 and between the airfoil tip 66 and the frangible line 88. The residual portion may extend from the frangible line 88 to the airfoil root 64 along the spanwise direction S. Optionally, a metallic leading edge shield 71 may cover an axially extending portion of the airfoil 62 including at least a portion of the leading edge 72. The metallic leading edge shield 71 can also cover portion of the tip 66 and trailing edge 74 (not shown in the figures).

As further illustrated in FIG. 3, the frangible line 88 may generally extend along the chordwise direction C between the leading edge 72 and the trailing edge 74. It should be recognized that the frangible line 88 may generally extend along the chordwise direction C at approximately the same point along the span. In other embodiments, the frangible line 88 may at least partially extend radially inward or outward (e.g., along the spanwise direction S) as the frangible line 88 extends axially along the chordwise direction C toward the trailing edge 74. For instance, in certain embodiments, the frangible line 88 may be defined along the chordwise direction C at one point along the span. In other embodiments, the frangible line 88 may extend along a variable percentage of the span from the leading edge 72 to the trailing edge 74.

In one embodiment, the frangible airfoil portion 94 may extend along at least 10% of the span from the airfoil tip 66, such as along a chordwise direction C at one point along spanwise. More particularly, as illustrated, the frangible airfoil portion 94 may define a frangible height 84 extending between the airfoil tip 66 and the frangible line 88. As such, the frangible height 84 may extend along at least ten percent of the span between the leading edge 72 and the trailing edge 74. In another embodiment, the frangible airfoil portion 94 and/or the frangible height 84 may extend along at least 15% but less than 50% of the span between the leading edge 72 and the trailing edge 74. In still other embodiments, the frangible airfoil portion 94 can extend along less than 50% of the span from the airfoil tip 66. The frangible airfoil portion 94 may have a reduced overall bending stiffness compared to the residual airfoil portion 92.

One or more SMA inserts 100 are disposed in the frangible airfoil portion 94. Disposition of one or more SMA inserts 100 allows for the frangible airfoil portion 94 of the airfoil tip 66 to change shape and/or deform in response to an event creating an imbalance. For instance, the one or more SMA inserts 100 allows the frangible airfoil portion 94 to deform following a load or impact upon the airfoil 62. For example, the frangible airfoil portion 94 including the SMA insert can change shape, structure, or deform at or radially outward from the frangible line 88. Specifically, in embodiments, the frangible airfoil portion 94 can be configured to at least partially delaminate when exposed to an event creating an imbalance without fully severing from the residual airfoil portion 92. For instance, inclusion of the SMA insert 100 within the frangible airfoil portion 94 allow for portions of the frangible airfoil portion 94 to delaminate without severing the entirety of the frangible airfoil portion 94 at or radially outward from the frangible line 88.

Figure 4:
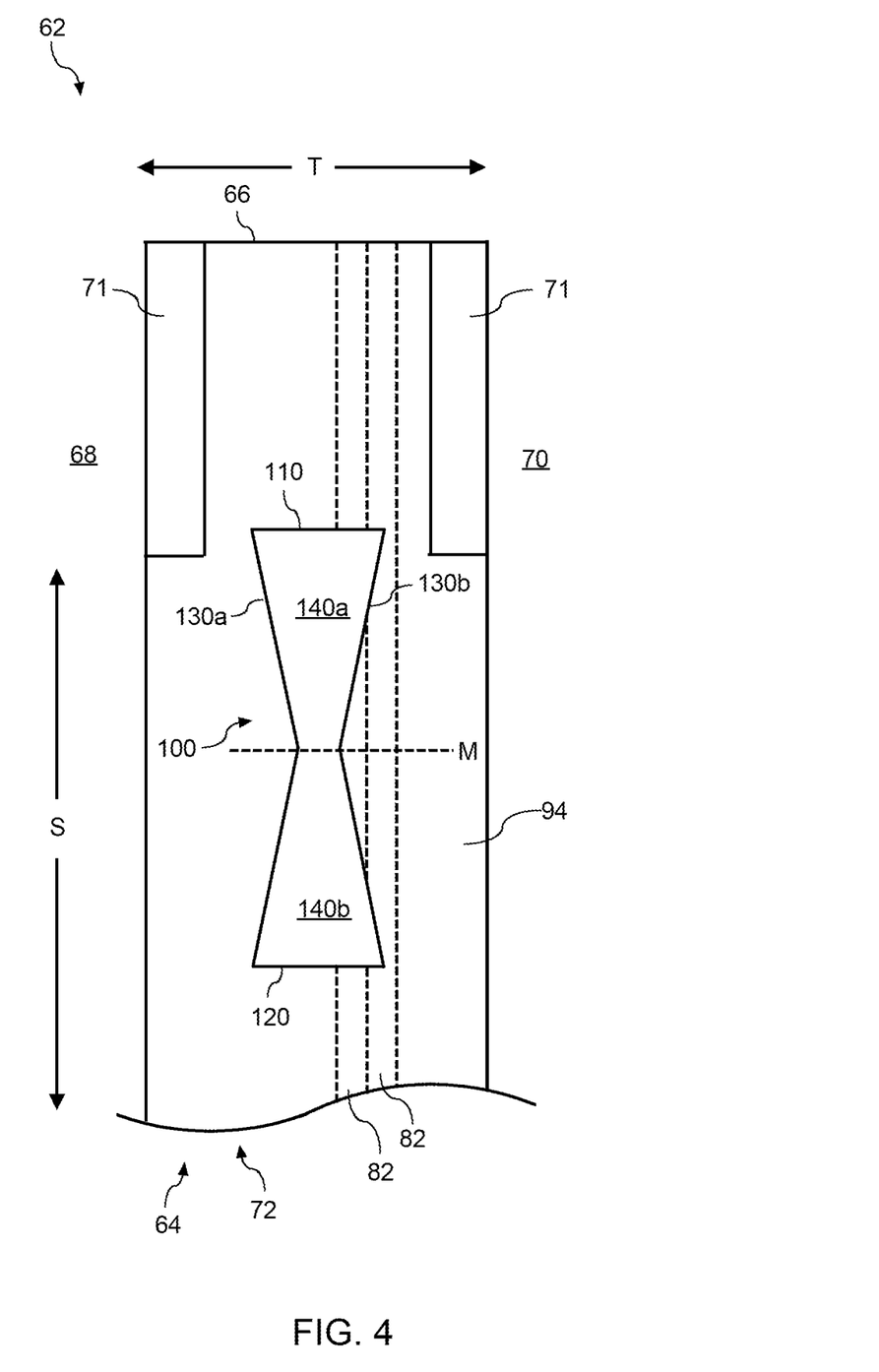
FIG. 4 illustrates a cross-section view along an axis B-B along the thickness T direction of the frangible airfoil portion in accordance with aspects of the present subject matter.

FIG. 4 illustrates a cross-section of airfoil 62 taken along the B-B axis as shown in FIG. 3. In other words, FIG. 4 illustrates a cross-section of the airfoil taken along the thickness T direction. The airfoil 62 includes a suction side 70 and pressure side 68 including a metallic leading edge shield 71 deposed on portions of the through thickness leading edge 72. An SMA insert 100 is disposed in the frangible airfoil portion 94 between the suction side 70 and pressure side 68 of the airfoil 62. The SMA insert 100 includes a top edge 110 disposed towards the airfoil tip 66 in the spanwise S direction and a bottom edge 120 disposed towards the airfoil root 64 in the spanwise S direction with respect to the top edge 110. The SMA insert 100 includes sides 130a, 130b disposed between and connecting the top edge 110 to the bottom edge 120. A midpoint M generally defines a point or an axis that generally is located around 50% of the spanwise height of the SMA insert 100. While the midpoint M is shown generally in the middle of the SMA insert 100 it should be appreciated that the midpoint M does not necessarily correspond to the exact midpoint M of the SMA insert 100 along the spanwise S direction. For instance, while the midpoint M is shown around 50% of the spanwise height, it should be appreciated that the midpoint can be defined anywhere from about 25% to about 75% of the spanwise height. The SMA insert 100 further includes a first leading edge face 140a and a second leading edge face 140b, which will be discussed in more detail below with respect to FIG. 5.

The SMA insert 100 is disposed in the frangible airfoil portion 94 generally between or within one or more composite plies 82. While only two exemplary composite plies 82 are shown, the disclosure is not so limited. In fact, any number of composite plies 82 situated in a variety of directions can be used to form the frangible airfoil portion 94 of the airfoil 62 as provided herein. Furthermore, while one or more composite plies 82 are shown in the spanwise S direction, the disclosure is not so limited. Indeed, any number of composite plies 82 oriented in a variety of directions, e.g. spanwise S, chordwise C, thickness T, can be used in the frangible airfoil portion 94 in accordance with example embodiments disclose herein.

The SMA insert 100 includes an insert geometry that facilitates mechanical interlocking between the one or more SMA inserts 100 and one or more composite plies 82 used to form the frangible airfoil portion 94. While an exemplary geometry is shown in FIG. 4, the disclosure is not so limited. In fact, any geometry capably of facilitating mechanical interlocking of the SMA insert 100 in composite plies 82 used to form the frangible airfoil portion 94 can be used. Suitable geometries can include I-shaped geometries, T-shaped geometries, Y-shaped geometries, X-shaped geometries, and/combinations and variations thereof.

Figure 5:
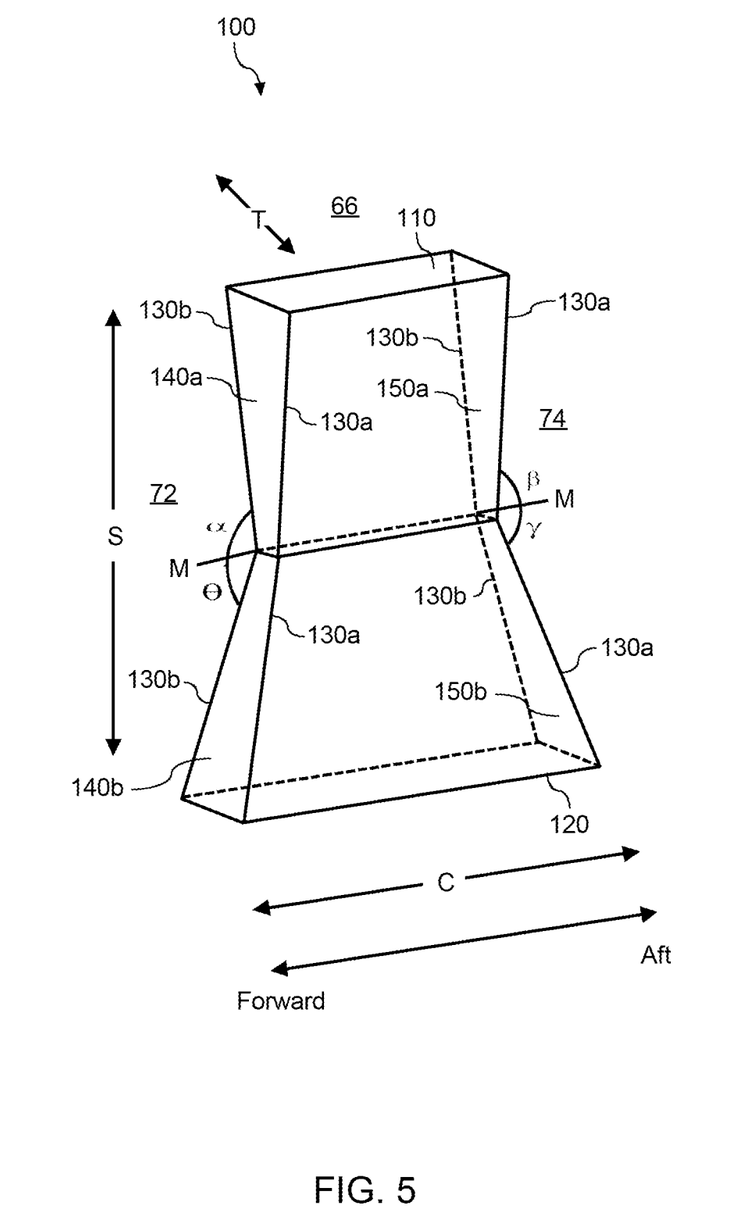
FIG. 5 illustrates a perspective view of a SMA insert in accordance with aspects of the present subject matter.

A perspective view of an example SMA insert 100 is shown in FIG. 5. The SMA insert 100 has a top edge 110 spaced from the airfoil tip 66 along the spanwise S direction and a bottom edge 120 distanced from the top edge 110 in a spanwise S direction. The sides 130a,130b of the SMA insert 100 are disposed in a tapered manner in order to facilitate mechanical interlocking of the SMA insert 100 within the composite plies 82 frangible airfoil portion 94 (not shown in FIG. 5). For example, sides 130a,130b taper in from the top edge 110 to a midpoint M along the spanwise S direction. Similarly, the sides 130a,130b taper in from the bottom edge 120 to the midpoint M along the spanwise direction S. Such tapering of the sides 130a,130b facilitates mechanical interlocking of the SMA insert 100 between and within one or more composite plies 82 used to form the frangible airfoil portion 94 (not shown in FIG. 5). Additionally, it should be appreciated that the SMA inserts 100, specifically sides 130a and 130b can taper in from the top edge 110 or bottom edge 120 to the midpoint M along any direction including the thickness T direction, the chordwise C direction, the spanwise S direction, and combinations thereof. Furthermore, as shown, the width of the top edge 110 and the bottom edge 120 in the thickness T direction is greater than the width of the midpoint M in the thickness direction T. In embodiments, the SMA insert 100 has a span height of from about 0.1 inches to about 6.0 inches, such as from about 1 inch to about 5 inches, such as from about 2 inches to about 4 inches.

The SMA insert 100 of FIG. 5, can be placed along the chordwise C direction between the leading edge 72 an trailing edge 74. As shown, the SMA insert 100 includes a first leading edge face 140a extending from the top edge 110 of the SMA insert 100 to the midpoint M and between sides 130a,130b. A second leading edge face 140b extends the bottom edge 120 of the SMA insert 100 to the midpoint M and between sides 130a,130b. A first leading edge face angle α is formed between the surface of the first leading edge face 140a and the axis at the midpoint M. As shown, in embodiments the first leading edge face angle α can range from about 110° to about 15°, such as from about 90° to about 30°, such as from about 75° to about 50°. In embodiments, the first leading edge face angle α includes an angle of less than about 90° in order to facilitate interlocking of the SMA insert 100 in the frangible airfoil portion 94. Similarly, a second leading edge face angle θ is formed between the surface of the second leading edge face 140b and the axis at the midpoint M. As shown, in embodiments the second leading edge face angle θ can range from about 110° to about 15°, such as from about 90° to about 30°, such as from about 75° to about 50°. In embodiments, the second leading edge face angle θ includes an angle of less than about 90° in order to facilitate interlocking of the SMA insert 100 in the frangible airfoil portion 94. The first leading edge face angle α and the second leading edge face angle θ can be the same or different. For instance, in certain embodiments, the first leading edge face angle α can be greater or less than the second leading edge face angle θ. For example, in order to tune the frangible or deformable properties of the airfoil 62, and more specifically the frangible airfoil portion 94, to desired parameters, the first leading edge face angle α can be less than or greater than the second leading edge face angle θ.

Similar features are also present on the SMA insert 100 along the trailing edge 74. Still referring to FIG. 5, the SMA insert 100 includes a first trailing edge face 150a extending from the top edge 110 of the SMA insert 100 to the midpoint M and between sides 130a,130b. A second trailing edge face 150b extends the bottom edge 120 of the SMA insert 100 to the midpoint M and between sides 130a,130b. A first trailing edge face angle β is formed between the surface of the first trailing edge face 150a and the axis about the midpoint M. As shown, in embodiments the first trailing edge face angle β can range from about 110° to about 15°, such as from about 90° to about 30°, such as from about 75° to about 50°. In embodiments, the first trailing edge face angle β includes an angle of less than about 90° in order to facilitate interlocking of the SMA insert 100 in the frangible airfoil portion 94. Similarly, a second trailing edge face angle γ is formed between the surface of the second trailing edge face 150b and the axis about the midpoint M. As shown, in embodiments the second trailing edge face angle γ can range from about 110° to about 15°, such as from about 90° to about 30°, such as from about 75° to about 50°. In embodiments, the second trailing edge face angle γ includes an angle of less than about 90° in order to facilitate interlocking of the SMA insert 100 in the frangible airfoil portion 94. The first trailing edge face angle β and the second trailing edge face angle γ can be the same or different. For instance, in certain embodiments, the first trailing edge face angle β can be greater or less than the second trailing edge face angle γ. For example, in order to tune the frangible or deformable properties of the airfoil 62, and more specifically the frangible airfoil portion 94, to desired parameters, the first trailing edge face angle β can be less than or greater than the second trailing edge face angle γ.

Figure 6:
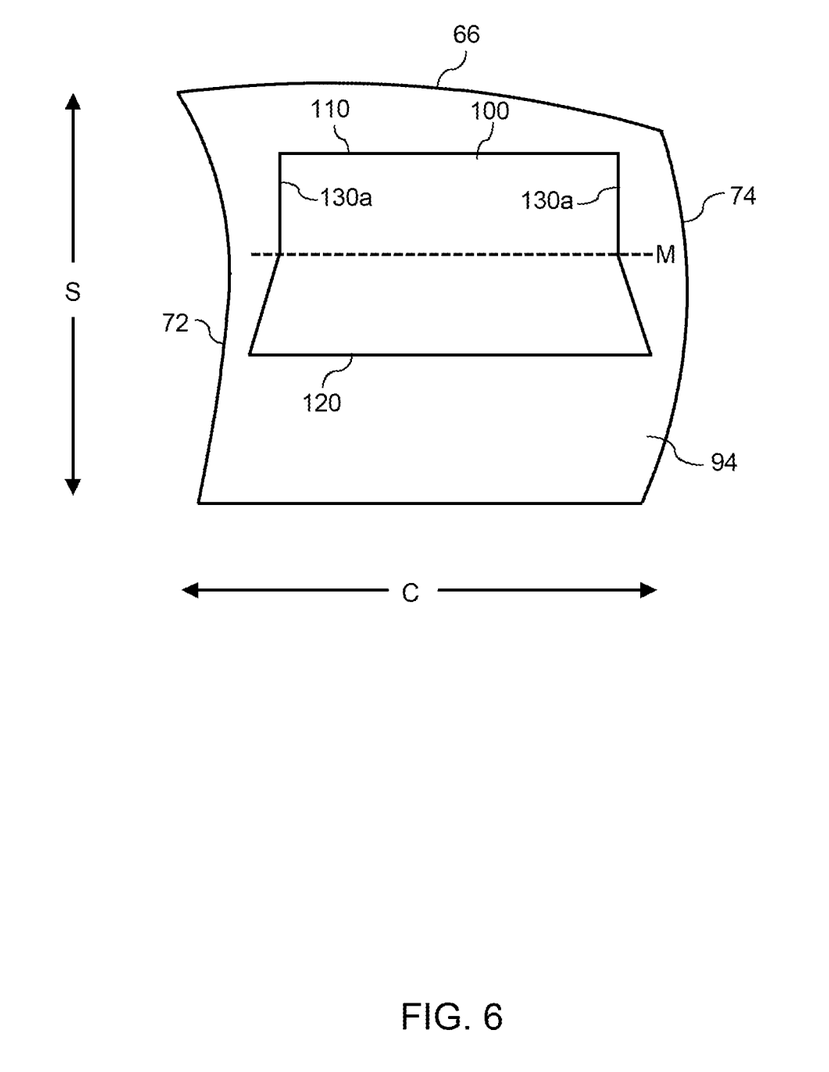
FIG. 6 illustrates a cross-section of one embodiment of the frangible airfoil portion including an SMA insert in accordance with aspects of the present subject matter.
Figure 7:
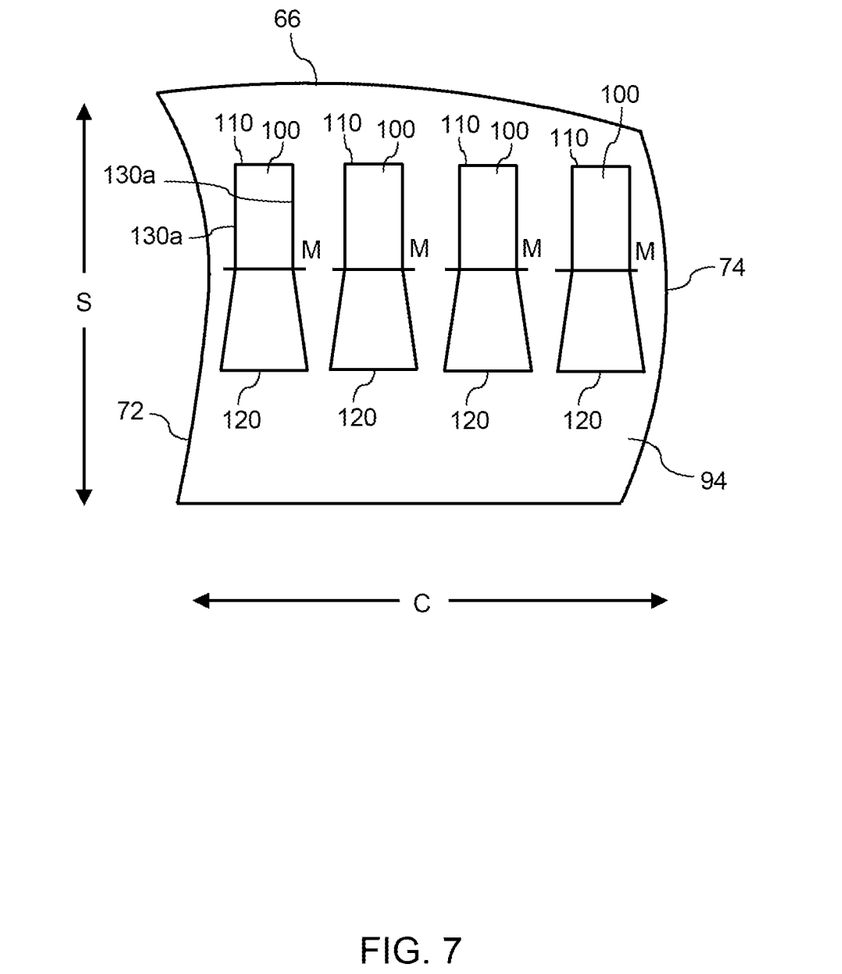
FIG. 7 illustrates a cross-section of one embodiment of the frangible airfoil portion including an SMA insert in accordance with aspects of the present subject matter.

FIGS. 6-7 illustrate SMA insert(s) 100 disposed in the frangible airfoil portion 94 with respect to the chordwise C direction. As shown, the SMA insert(s) 100 are disposed along the chordwise C direction and spanwise S direction with respect to the airfoil tip 66. Specifically, FIG. 6 illustrates an SMA insert 100 including a single SMA insert 100 spanning from the leading edge 72 to the trailing edge 74 of the airfoil 62. As shown, the insert 100 includes a top edge 110, bottom edge 120, and sides 130a. In other embodiments, as shown in FIG. 7, the SMA insert 100 can include one or more, such as a plurality, of SMA inserts 100 placed sequentially along the chordwise direction from the leading edge 72 to the trailing edge 74 of the airfoil 62. Similar to the insert of FIG. 6, the SMA inserts 100 of FIG. 7 include top edges 110, bottom edges 120, side 130a, and midpoints M as shown.

In some embodiments, the SMA insert(s) may include the SMA material as a major constituent, in an amount greater than 50 wt. % of the SMA insert. In certain embodiments, the SMA insert may be essentially composed of the SMA material. A SMA material is generally an alloy capable of returning to its original shape after being deformed. For instance, SMA materials may define a hysteresis effect where the loading path on a stress-strain graph is distinct from the unloading path on the stress-strain graph. A SMA material may also provide varying stiffness, in a pre-determined manner, in response to certain ranges of stresses and temperatures. The change in stiffness of the shape memory alloy is due to a temperature related, solid state microstructural phase change that enables the alloy to change from one physical shape to another physical shape. The changes in stiffness of the SMA material may be developed by working and annealing a preform of the alloy at or above a temperature at which the solid state micro-structural phase change of the shape memory alloy occurs. The temperature at which such phase change occurs is generally referred to as the critical temperature or transition temperature of the alloy. In the manufacture of a SMA insert intended to change stiffness during operation of the airfoil 62, the SMA insert may be formed to have one operative stiffness (e.g., a first stiffness) below a transition temperature and have another stiffness (e.g., a second stiffness) at or above the transition temperature.

Some shape memory alloys used herein are characterized by a temperature-dependent phase change. These phases include a martensite phase and an austenite phase. The martensite phase generally refers to a lower temperature phase. Whereas the austenite phase generally refers to a higher temperature phase. The martensite phase is generally more deformable, while the austenite phase is generally less deformable. When the shape memory alloy is in the martensite phase and is heated to above a certain temperature, the shape memory alloy begins to change into the austenite phase. The temperature at which this phenomenon starts is referred to as the austenite start temperature (As). The temperature at which this phenomenon is completed is called the austenite finish temperature (Af). When the shape memory alloy, which is in the austenite phase, is cooled, it begins to transform into the martensite phase. The temperature at which this transformation starts is referred to as the martensite start temperature (Ms). The temperature at which the transformation to martensite phase is completed is called the martensite finish temperature (Mf). As used herein, the term "transition temperature" without any further qualifiers may refer to any of the martensite transition temperature and austenite transition temperature. Further, "below transition temperature" without the qualifier of "start temperature" or "finish temperature" generally refers to the temperature that is lower than the martensite finish temperature, and the "above transition temperature" without the qualifier of "start temperature" or "finish temperature" generally refers to the temperature that is greater than the austenite finish temperature.

In some embodiments, the SMA insert may define a first stiffness at a first temperature and define a second stiffness at a second temperature, wherein the second temperature is different from the first temperature. Further, in some embodiments, one of the first temperature or the second temperature is below the transition temperature and the other one may be at or above the transition temperature. Thus, in some embodiments, the first temperature may be below the transition temperature and the second temperature may be at or above the transition temperature. While in some other embodiments, the first temperature may be at or above the transition temperature and the second temperature may be below the transition temperature. Further, various of the SMA inserts 100 described herein may be configured to have different first stiffnesses and different second stiffnesses at the same first and second temperatures.

Non-limiting examples of SMAs that may be suitable for forming various of the SMA inserts described herein may include nickel-titanium (NiTi) and other nickel-titanium based alloys such as nickel-titanium hydrogen fluoride (NiTiHf) and nickel-titanium palladium (NiTiPd). However, it should be appreciated that other SMA materials may be equally applicable to the current disclosure. For instance, in certain embodiments, the SMA material may include nickel-aluminum based alloys, copper-aluminum-nickel alloys, or alloys containing zinc, zirconium, copper, gold, platinum, and/or iron. The alloy composition may be selected to provide the desired stiffness effect for the application such as, but not limited to, damping ability, transformation temperature and strain, the strain hysteresis, yield strength (of martensite and austenite phases), resistance to oxidation and hot corrosion, ability to change shape through repeated cycles, capability to exhibit one-way or two-way shape memory effect, and/or a number of other engineering design criteria. Suitable shape memory alloy compositions that may be employed with the embodiments of present disclosure may include, but are not limited to NiTi, NiTiHf, NiTiPt, NiTiPd, NiTiCu, NiTiNb, NiTiVd, TiNb, CuAlBe, CuZnAl and some ferrous based alloys. In some embodiments, NiTi alloys having transition temperatures between 5° C. and 150° C. are used. NiTi alloys may change from austenite to martensite upon cooling.

Moreover, SMA materials may also display superelasticity. Superelasticity may generally be characterized by recovery of large strains, potentially with some dissipation. For instance, martensite and austenite phases of the SMA material may respond to mechanical stress as well as temperature induced phase transformations. For example, SMAs may be loaded in an austenite phase (i.e. above a certain temperature). As such, the material may begin to transform into the (twinned) martensite phase when a critical stress is reached. Upon continued loading and assuming isothermal conditions, the (twinned) martensite may begin to detwin, allowing the material to undergo plastic deformation. If the unloading happens before plasticity, the martensite may generally transform back to austenite, and the material may recover its original shape by developing a hysteresis.

Various of the SMA inserts disclosed herein may be in an unstressed state before assembly of the SMA insert within or in association with the airfoil 62. Moreover, after assembly or arrangement of the SMA insert(s) with respect to the airfoil, the SMA insert(s) may be in a pre-stressed state. For instance, the SMA insert(s) may be placed in compression in the pre-stressed state after assembly or arrangement with respect to the airfoil 62.

In some embodiments, an individual SMA insert or some or all of the SMA inserts may be in a pre-strained or pre-stressed condition (e.g., the pre-stressed state). The SMA insert(s) in the pre-stressed condition may shift the hysteresis cycle of the SMA insert(s) to a range of stresses that is different from that of a non-pre-stressed SMA insert (e.g., when the SMA insert is in the unstressed state). The pre-stressing further serves to maximize the damping function of the SMA insert(s) so that the material is active at the maximum stresses generated. More particularly, placing the SMA insert(s) in a pre-stress position or state may allow for inserts to enter a hysteretic bending regime without requiring a relatively large amount of displacement. For instance, in certain embodiments, the various SMA inserts disclosed herein may be pre-stressed between 70 GPa and 150 GPa. Further, it should be appreciated that, in embodiments including more than one SMA insert, the SMA inserts may be pre-stressed to the same or approximately the same stress or strain. However, additionally or alternatively, one or more SMA inserts may be pre-stressed or pre-strained at different degrees in order to provide an appropriate amount of damping for the position or conditions of the particular SMA insert.

In embodiments, the airfoil 62, is formed at least partially from a ceramic matrix composite material. Composite materials may include, but are not limited to, metal matrix composites (MMCs), polymer matrix composites (PMCs), or ceramic matrix composites (CMCs). Composite materials, such as may be utilized in the airfoil 62, generally comprise a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as the composite plies 82) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Similarly, in various embodiments, PMC materials may be fabricated by impregnating a fabric or unidirectional tape with a resin (prepreg), followed by curing. For example, multiple layers of prepreg plies (e.g., the composite plies 82) may be stacked to the proper thickness and orientation for the part, and then the resin may be cured and solidified to render a fiber reinforced composite part. As another example, a die may be utilized to which the uncured layers of prepreg may be stacked to form at least a portion of the composite component. The die may be either a closed configuration (e.g., compression molding) or an open configuration that utilizes vacuum bag forming. For instance, in the open configuration, the die forms one side of the blade (e.g., the pressure side 68 or the suction side 70). The PMC material is placed inside of a bag and a vacuum is utilized to hold the PMC material against the die during curing. In still other embodiments, the airfoil 62 may be at least partially formed via resin transfer molding (RTM), light resin transfer molding (LRTM), vacuum assisted resin transfer molding (VARTM), a forming process (e.g. thermoforming), or similar.

Prior to impregnation, the fabric may be referred to as a "dry" fabric and typically comprises a stack of two or more fiber layers. The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. Other embodiments may include other textile forms such as plane weave, twill, or satin.

In one embodiment, PMC materials can be produced by dispersing dry fibers into a mold, and then flowing matrix material around the reinforcement fibers. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

During manufacturing of the airfoil 62 described herein, SMA inserts 100 can be placed between one or more plies and processed accordingly to provide the frangible airfoil 62 as will be discussed further hereinbelow.

Figure 8:
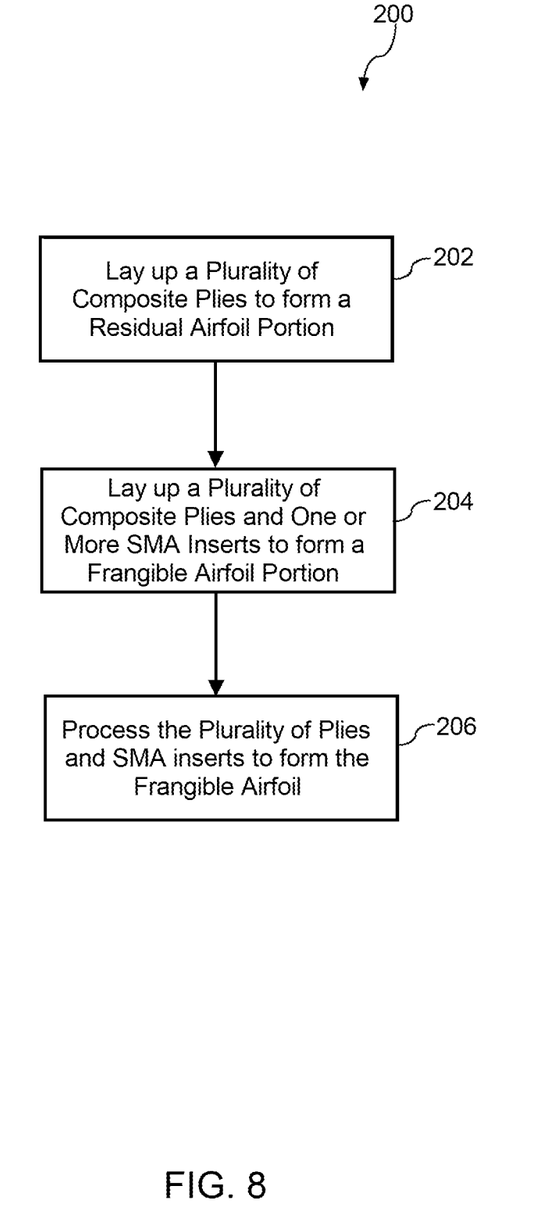
FIG. 8 depicts a method of forming a frangible airfoil in accordance with aspects of the present subject matter.

Referring now to FIG. 8, a method 200 of forming a frangible airfoil is depicted according to aspects of the present subject matter. Particularly, the method 200 may be used to form various embodiments of the airfoil 62 as illustrated in FIGS. 2-7. For, instance, the frangible airfoil may define a span extending in a spanwise direction S between a root and a tip, a chordwise direction C extending between a leading edge and a trailing edge, and a thickness direction T extending between a pressure side and a suction side.

The method 200 may include 202 laying up a plurality of composite plies to form a residual airfoil portion. The plurality of composite plies may include a composite material such as a CMC material. The composite plies may be laid up on a tool, mandrel, mold, or other suitable supporting device or surface. At 204, the method includes laying up a plurality of composite plies and one or more shape memory alloy inserts to form a frangible portion of the airfoil. The plies can be oriented along the chordwise direction C, the thickness direction T, the span direction S, or combinations thereof depending on the desired characteristics of the airfoil. As one or more plies are laid, one or more SMA inserts can be placed between one or more plies. For example, a ply can be laid, the SMA insert can be position on the ply and then one or more plies can be laid over the ply and SMA insert. One or more SMA inserts can be included in between one or more composite plies used to form the frangible portion of the airfoil. The plurality of composite plies may include a composite material such as a CMC material. The composite plies may be laid up on a tool, mandrel, mold, or other suitable supporting device or surface.

Another step of the method 200 may include 206 processing the plurality of plies to form the frangible airfoil. In one embodiment, processing the composite plies may include compacting the composite plies. In another embodiment of the method 200, processing the composite plies may include autoclaving the composite plies. In a still further embodiment of the method 200, processing the composite plies may include both compacting and autoclaving the composite plies. For instance, the composite plies may be compacted and then processed in an autoclave. The compaction may be performed at atmosphere, i.e., at room temperature and pressure. The autoclave cycle may impart stiffness to the final ply and/or layup assembly through complete drying and/or curing of the composite constituents and produces the final dimensions of the composite component through full consolidation of the plies and/or sub-assemblies.

Further, in embodiments in which the composite plies are processed in an autoclave, the composite plies may be autoclaved using soft and/or hard tooling. For instance, the composite plies may be autoclaved using metallic tooling, i.e., hard tooling, that is shaped to impart a desired shape to the frangible airfoil. As another example, the composite plies may be autoclaved using soft tooling such as a vacuum bag, e.g., the composite plies may be supported on a metal tool and then the composite plies and tool may be bagged and the air removed from the bag to apply pressure to and compact the composite plies before the composite plies are processed in a autoclave cycle. For instance, processing composite plies may include autoclaving the composite plies to form an autoclaved body. Further, another step may include firing the autoclaved body to form a fired body. Processing the composite plies may further include densifying the fired body to form the composite component. In certain embodiments, processing the composite plies may include at least one of melt infiltration or polymer infiltration and pyrolysis.

In embodiments in which the composite material is a CMC material, the autoclaved body may undergo firing (or burn-off) to form a fired body, followed by densification to produce a densified CMC component that is a single piece component, i.e., the component is a continuous piece of CMC material. For instance, after autoclaving, the component may be placed in a furnace to burn off any mandrel-forming materials and/or solvents used in forming the CMC plies and to decompose binders in the solvents, and then placed in a furnace with silicon to convert a ceramic matrix precursor of the plies into the ceramic material of the matrix of the CMC component. The silicon melts and infiltrates any porosity created within the matrix as a result of the decomposition of the binder during burn-off/firing; the melt infiltration of the CMC component with silicon densifies the CMC component. However, densification may be performed using any known densification technique including, but not limited to, Silcomp, melt-infiltration (MI), chemical vapor infiltration (CVI), polymer infiltration and pyrolysis (PIP), and oxide/oxide processes. In one embodiment, densification and firing may be conducted in a vacuum furnace or an inert atmosphere having an established atmosphere at temperatures above 1200° C. to allow silicon or another appropriate material or materials to melt-infiltrate into the component.

Optionally, after processing, the composite component may be finish machined, if and as needed, and coated with one or more coatings, such as an environmental barrier coating (EBC). For example, the composite plies that are wrapped around the core may be oversized such that a portion of the composite plies extend beyond the desired trailing edge of the airfoil. Accordingly, after processing, the composite plies may be machined to define the trailing edge.

Of course, the method 200 described with respect to FIG. 8 is provided by way of example only. As such, other known methods or techniques for compacting and/or curing composite plies, as well as for densifying a CMC component, may be utilized. Alternatively, any combinations of these or other known processes may be used and in any suitable order. Further, although the method 200 of FIG. 8 is described relative to fan blades, the method 200 may also be used to form other composite components, such as turbine nozzle blades and turbine stator vanes and/or compressor blades and vanes including airfoils as exemplary composite components.

Further aspects of the disclosure are provided by the subject matter of the following clauses:

An airfoil defining a span extending in a spanwise direction between a root and a tip; a chordwise direction extending between a leading edge and a trailing edge; a thickness direction extending between a pressure side and a suction side; and a frangible line at a location along the span, the airfoil comprising: a frangible airfoil portion extending between the leading edge and the trailing edge and extending along the span between the tip and the frangible line, the frangible airfoil portion comprising a plurality of composite plies and one or more shape memory alloy (SMA) inserts; and a residual airfoil portion extending from the frangible line to the root along the span, the residual airfoil portion comprising a plurality of composite plies, wherein the frangible airfoil portion deforms or partially detaches relative to the residual airfoil portion at or radially outward from the frangible line following an event creating imbalance.

The airfoil of any preceding clause, wherein the frangible airfoil portion extends along at least 10% but less than 50% of the span from the tip.

The airfoil of any preceding clause, wherein the one or more SMA inserts comprise nickel-titanium (NiTi), a nickel-titanium based alloy, and combinations thereof.

The airfoil of any preceding clause, wherein the one or more SMA inserts comprise an insert geometry for facilitating mechanical interlock between the one or more SMA inserts and the plurality of composite plies.

The airfoil of any preceding clause, wherein the one or more SMA inserts comprise one or more sides that taper in from a top edge to a midpoint along the thickness direction, the spanwise direction, the chordwise direction, and combinations thereof, and one or more sides that taper in from a bottom edge to the midpoint along the thickness direction, the span direction, the chordwise direction, and/or both.

The airfoil of any preceding clause, wherein the one or more SMA inserts comprise a span height of from about 0.1 inches to about 6.0 inches.

The airfoil of any preceding clause, wherein the one or more SMA inserts comprise a plurality of SMA inserts disposed sequentially along the chordwise direction.

The airfoil of any preceding clause, wherein the plurality of composite plies comprise carbon matrix composite plies.

The airfoil of any preceding clause, comprising a metallic leading edge shield covering at least a portion of the leading edge.

The airfoil of any preceding clause, wherein the airfoil is a fan blade of a gas turbine engine.

A gas turbine engine comprising: a turbomachine including a compressor, a combustor, and a turbine arranged in serial flow order; and a plurality of airfoils rotatable with the turbomachine, each of the plurality of airfoils defining a span extending in a spanwise direction between a root and a tip; a chordwise direction extending between a leading edge and a trailing edge; a thickness direction extending between a pressure side a suction side; and a frangible line at a location along the span, each airfoil comprising: a frangible airfoil portion extending between the leading edge and the trailing edge and extending along the span between the tip and the frangible line, the frangible airfoil portion comprising a plurality of composite plies and one or more shape memory alloy (SMA) inserts; and a residual airfoil portion extending from the frangible line to the root along the span, the residual airfoil portion comprising a plurality of composite plies, wherein the frangible airfoil portion deforms or partially detaches relative to the residual airfoil portion at or radially outward from the frangible line following an event creating imbalance.

The gas turbine engine of any preceding clause, further comprising a fan section including the plurality of airfoils configured as fan blades.

The gas turbine engine of any preceding clause, wherein the frangible airfoil portion extends along at least 10% but less than 50% of the span from the tip.

The gas turbine engine of any preceding clause, wherein the one or more SMA inserts comprise nickel-titanium (NiTi), a nickel-titanium based alloy, and combinations thereof.

The gas turbine engine of any preceding clause, wherein the one or more SMA inserts comprise an insert geometry for facilitating mechanical interlock between the one or more SMA inserts and the plurality of composite plies.

The gas turbine engine of any preceding clause, wherein the one or more SMA inserts comprise one or more sides that taper in from a top edge to a midpoint along the thickness direction, the spanwise direction, the chordwise direction, and combinations thereof, and one or more sides that taper in from a bottom edge to the midpoint along the thickness direction, the span direction, the chordwise direction, and/or both.

The gas turbine engine of any preceding clause, wherein the one or more SMA inserts comprise a span height of from about 0.1 inches to about 6.0 inches.

The gas turbine engine of any preceding clause, wherein the plurality of composite plies comprise carbon matrix composite plies.

A method of forming a frangible airfoil, the frangible airfoil defining a span extending in a spanwise direction between a root and a tip; a chordwise direction extending between a leading edge and a trailing edge; and a thickness direction extending between a pressure side and a suction side, the method comprising: laying up a plurality of composite plies to form a residual airfoil portion; laying up a plurality of composite plies and one or more SMA inserts to form a frangible airfoil portion; and processing the plurality of composite plies and one or more SMA inserts to form the frangible airfoil.

The method of any preceding clause, wherein the one or more SMA inserts comprise nickel-titanium (NiTi), a nickel-titanium based alloys, and combinations thereof.

This written description uses exemplary embodiments to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil defining a span extending in a spanwise direction between a root and a tip; a chordwise direction extending between a leading edge and a trailing edge; a thickness direction extending between a pressure side and a suction side; and a deformation line at a location along the span, the airfoil comprising:
    a deformable airfoil portion extending between the leading edge and the trailing edge and extending along the span between the tip and the deformation line, the deformable airfoil portion comprising a plurality of composite plies and one or more shape memory alloy (SMA) inserts; and
    a residual airfoil portion extending from the deformation line to the root along the span, the residual airfoil portion comprising a plurality of composite plies, wherein the deformable airfoil portion deforms or partially detaches relative to the residual airfoil portion at or radially outward from the deformation line following an event creating imbalance,
    wherein the one or more SMA inserts comprise one or more sides that taper in from a bottom edge to the midpoint along the thickness direction, the span direction, the chordwise direction, or a combination thereof.

2. The airfoil of claim 1, wherein the deformable airfoil portion extends along at least 10% but less than 50% of the span from the tip.

3. The airfoil of claim 1, wherein the one or more SMA inserts comprise nickel-titanium (NiTi), a nickel-titanium based alloy, and combinations thereof.

4. The airfoil of claim 1, wherein the one or more SMA inserts comprise an insert geometry for facilitating mechanical interlock between the one or more SMA inserts and the plurality of composite plies.

5. The airfoil of claim 1, wherein the one or more SMA inserts comprise one or more sides that taper in from a top edge to a midpoint along the thickness direction, the spanwise direction, the chordwise direction, or a combination thereof.

6. The airfoil of claim 1, wherein the one or more SMA inserts comprise a span height of from 0.1 inches to 6.0 inches.

7. The airfoil of claim 1, wherein the one or more SMA inserts comprise a plurality of SMA inserts disposed sequentially along the chordwise direction.

8. The airfoil of claim 1, wherein the plurality of composite plies comprise carbon matrix composite plies.

9. The airfoil of claim 1, comprising a metallic leading edge shield covering at least a portion of the leading edge.

10. The airfoil of claim 1, wherein the airfoil is a fan blade of a gas turbine engine.

11. A gas turbine engine comprising:

a turbomachine including a compressor, a combustor, and a turbine arranged in serial flow order; and a plurality of airfoils rotatable with the turbomachine, each of the plurality of airfoils defining a span extending in a spanwise direction between a root and a tip; a chordwise direction extending between a leading edge and a trailing edge; a thickness direction extending between a pressure side a suction side; and a deformation line at a location along the span, each airfoil comprising:

a deformable airfoil portion extending between the leading edge and the trailing edge and extending along the span between the tip and the deformation line, the deformable airfoil portion comprising a plurality of composite plies and one or more shape memory alloy (SMA) inserts; and a residual airfoil portion extending from the deformation line to the root along the span, the residual airfoil portion comprising a plurality of composite plies, wherein the deformable airfoil portion deforms or partially detaches relative to the residual airfoil portion at or radially outward from the deformation line following an event creating imbalance, wherein the one or more SMA inserts comprise one or more sides that taper in from a bottom edge to the midpoint along the thickness direction, the span direction, the chordwise direction, or a combination thereof.

12. The gas turbine engine of claim 11, further comprising a fan section including the plurality of airfoils configured as fan blades.

13. The gas turbine engine of claim 11, wherein the deformable airfoil portion extends along at least 10% but less than 50% of the span from the tip.

14. The gas turbine engine of claim 11, wherein the one or more SMA inserts comprise nickel-titanium (NiTi), a nickel-titanium based alloy, and combinations thereof.

15. The gas turbine engine of claim 11, wherein the one or more SMA inserts comprise an insert geometry for facilitating mechanical interlock between the one or more SMA inserts and the plurality of composite plies.

16. The gas turbine engine of claim 11, wherein the one or more SMA inserts comprise one or more sides that taper in from a top edge to a midpoint along the thickness direction, the spanwise direction, the chordwise direction, and combinations thereof.

17. The gas turbine engine of claim 11, wherein the one or more SMA inserts comprise a span height of from 0.1 inches to 6.0 inches.

18. The gas turbine engine of claim 11, wherein the plurality of composite plies comprise carbon matrix composite plies.

* * * * *